May 24, 1960 — H. F. EVERETT — 2,937,460
EDUCATIONAL AID
Filed Nov. 25, 1957
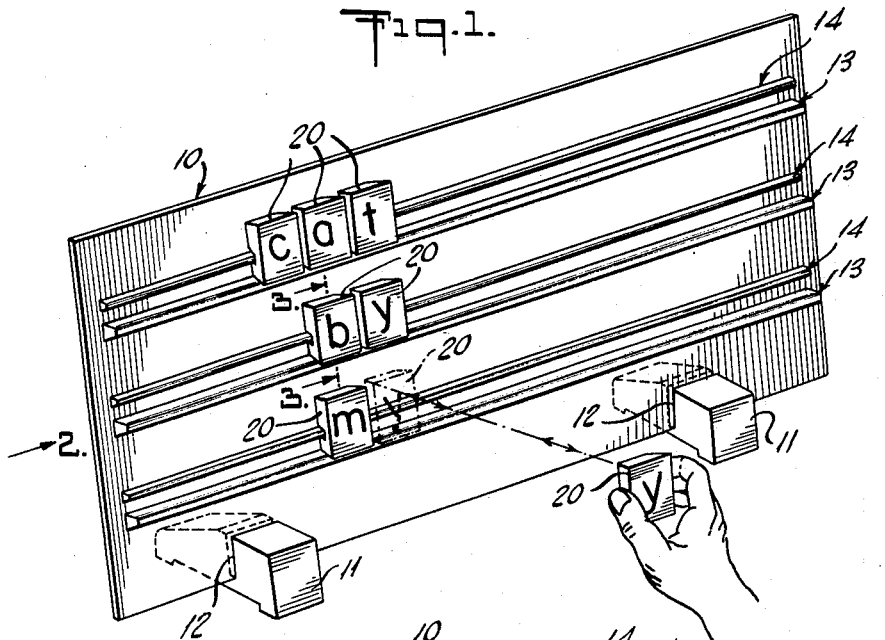
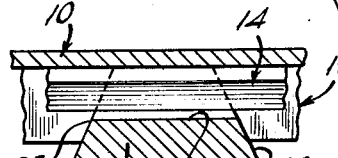
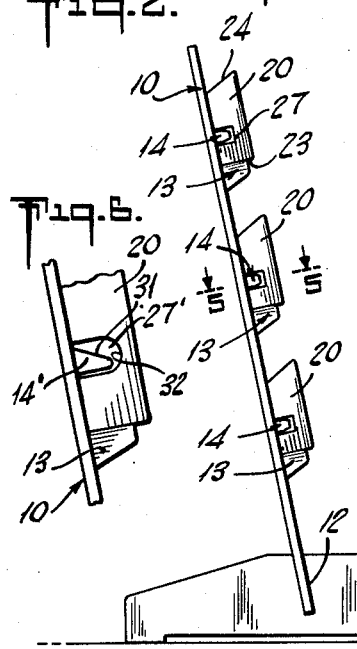
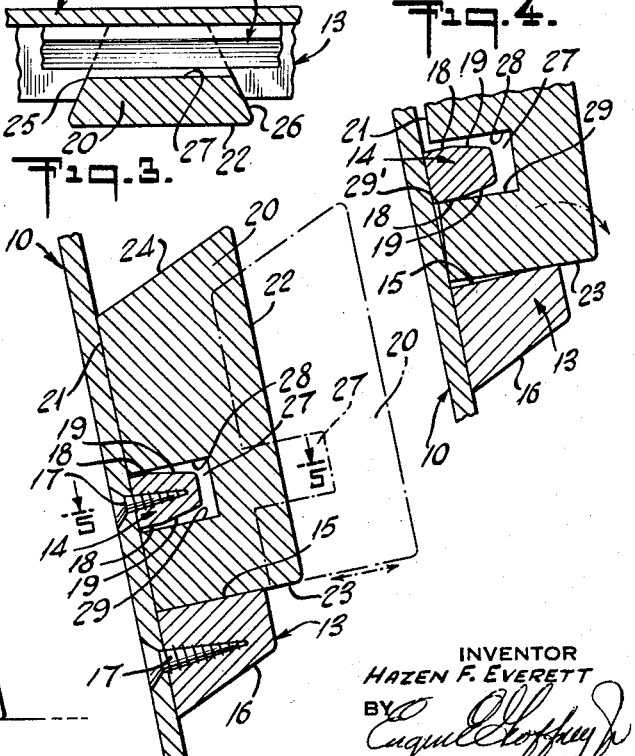
INVENTOR
HAZEN F. EVERETT

United States Patent Office 2,937,460
Patented May 24, 1960

2,937,460

EDUCATIONAL AID

Hazen F. Everett, 43 W. Passaic St., Rochelle Park, N.J.

Filed Nov. 25, 1957, Ser. No. 698,814

3 Claims. (Cl. 35—73)

This invention relates to an educational aid and more specifically to a novel and improved device particularly useful, among other things, for aiding children in learning the alphabet and numbering system and becoming familiar with other indicia while at the same time providing a high degree of play value.

Various types of toys have been proposed as indicia teaching aids for children utilizing boards or racks on which children place blocks carrying letters or numbers. Some of these proposed devices have been found unsatisfactory because they were too complicated for children of pre-school age, or even children in the first grades, while others require a manual dexterity that often exceeds the ability of the child. Moreover, known devices have not provided for the presentation of indicia such as letters and numbers in a manner to insure that each letter or number placed on the support by the child or student will be presented to the child in a properly oriented position.

These and other difficulties have been overcome with this invention which provides an improved educational devices including a plurality of indicia-carrying members and means for supporting said members so that the latter, when placed on the board, will present each letter, number or other figure, in its proper position.

Another object of the invention resides in a novel and improved board and indicia carrying members that may be quickly and easily placed in removable engagement with the board.

A still further object of the invention resides in a novel and improved educational aid for the display of indicia that is characterized by its simplicity, relatively low cost and high degree of play value.

A still further object of the invention resides in a novel and improved educational aid, particularly for children, that not only aids a child in recognizing indicia in their proper aspects, but also stimulates proper spelling habits.

The above and other objects of the invention will become more apparent from the following description and accompanying drawings forming part of this invention.

In the drawings:

Fig. 1 is a perspective view of one embodiment of the invention;

Fig. 2 is a side elevational view of the invention taken in the direction of the arrow 2 of Fig. 1;

Fig. 3 is a cross sectional view of Fig. 1 taken along the line 3—3 thereof;

Fig. 4 is a fragmentary section of Fig. 3 illustrating one aspect of the invention;

Fig. 5 is a cross sectional view of Figs. 2 and 3 taken along the lines 5—5 thereof; and Fig. 6 is a cross sectional view of a modification of the invention.

As pointed out above, the educational aid in accordance with the invention provides means whereby one or more indicia-carrying blocks or members can be placed on and supported by a board so that the indicia which may be letters, numbers, animals or the like, can be presented in only one aspect. In this way a child will become familiar with the indicia as they are normally used. In addition, the configuration of the blocks is so arranged that a number of the blocks cannot be displaced easily on the board, but each block must generally be moved individually to prevent one or more blocks from falling when the board is in a vertical or slightly inclined position. These features have been found to stimulate and accelerate the formation of proper learning habits.

Referring now to the illustrated embodiment of the invention, it includes a board 10 supported in either a vertical or inclined position. In the case of a board to be supported on the surface of a table, a pair of legs 11, each having a transverse slot 12 therein for receipt of the board may be used to support the board in a slightly inclined position as illustrated.

The face of the board 10 includes a number of sets of horizontally disposed strips with the strips of each set being denoted by the numerals 13 and 14. respectively. Any number of sets of strips may be employed, depending on the size of the board 10. The lower strip 13 of each set is provided with an upper face 15 that is substantially perpendicular to the face of the board 10, and a lower face 16 inclined relative to the face 15. The strip 13 may be secured to the board 10 in any desired manner, as by suitable screws 17 inserted through the board 10 and into the strip. It will be observed as the description proceeds, that if the board 10 is supported with the inclined face 16 of the strip 13 to the top, a block cannot be rested on the top surface and if a block is placed in position on the board it will tend to fall from the board with the slightest jar.

The upper strip 14 is somewhat narrower than the strip 13 and is substantially shallower in depth. The base of the strip 14 has parallel sides 18 which are substantially perpendicular with the face of the board 10 and the outer portion of the strip 14 is tapered as indicated at 19 to facilitate attachment of the blocks. The spacing between the strips 13 and 14 is small in comparison to the height of the blocks 20, so that the blocks 20 can only be placed in one position on the strips.

The blocks 20 are each preferably provided with parallel front and rear faces 21 and 22, respectively. The bottom face 23 of the block is at right angles to the face 21, while the top face 24 is inclined relative to the face 23. The side edges 25 and 26 are each tapered inwardly from the front face 22 to the rear face 21. The rear face 21 includes a transverse slot 27 having substantially parallel upper and lower faces 28 and 29. The distance between the upper and lower faces 28 and 29 of the slot 27 is slightly greater than the width of the strip 14 as measured between the faces 18 and the lower edge 29 of the slot 27 is spaced a distance from the lower face 23 of the block slightly less than the distance between the lower face 18 of the strip 14 and the upper face 15 of the strip 13.

With the foregoing arrangement a block 20 can be placed in engagement with and supported by the strips 13 and 14 by holding it substantially parallel to the board 10 and then moving the slot 27 into engagement with the strip 14. At the same time a block which is engaged with the strips 13 and 14 can be slid lengthwise thereof and may be readily removed by gripping the sides and withdrawing it in a direction perpendicular to the board 10, as indicated in Fig. 1.

The slot 27 is preferably located relative to the block 20 so that it is disposed well below the center line of the block with that portion of the block between the bottom face 20 and the bottom portion 29 of the slot 27 being relatively narrow. With this arrangement, when a block is placed in position on the strips as shown, the slight inclination of the board will cause the block to rest firmly against the board. If the board should be tilted forwardly, the block will remain in place as the lower corner 29' of the slot 27 will bear against the lower edge 18 of the strip 14 and the bottom surface 23 of the block will bear against the outer corner of the strip 14. In actual practice it has been found that even if the board is in a vertical or forwardly inclined position, the blocks will remain in place.

The arrangement of the blocks and the cooperating strips 13 and 14 as described above permit the blocks to be placed on the board in only one position. When the device is used as a training aid, with the blocks carrying indicia such as letters, numbers, animals and the like on the outer faces 22, the indicia will be presented to the child in the proper manner so that he will become accustomed to the indicia as they should appear. While the board will carry suitable markings indicating the top, should it be erected in an inverted position, blocks that may be placed on the strips will fall at the slightest jar. In this way the child will readily learn the manner in which the board should be erected and, once having erected the board properly, the blocks can be inserted in place in only one manner.

Another aspect of this invention resides in the configuration of the side faces 25 and 26 of the blocks. The tapering of the blocks in this manner facilitates removal of the blocks by having relatively sharp edges for engagement by the fingers.

In addition, and perhaps more important, should a child endeavor to spell a particular word by placing appropriate blocks in line and in the course of this procedure omit a letter, it will be necessary for him to remove the blocks following the omission in order to insert an additional letter. This end is attained by the tapered side edges 25 and 26 which cause the blocks to skew outwardly from the panel should a number of the blocks be moved en masse by pushing just one of them. This difficulty encountered by a child when omitting a letter tends to stimulate proper learning habits and will cause a child to think more carefully when spelling a word before actually placing the blocks in position.

Fig. 6 illustrates a slightly modified embodiment of the invention wherein the upper strip 14' has a slightly modified configuration. Instead of the symmetrical cross sectional configuration the strip 14' has an upper inclined surface 31 coordinating with the inclination of the board 10 and the characteristics of the blocks 20 so that should a block be placed on the surface 31 the center of gravity of the block will cause it to tip forwardly off the board. The same effect is obtained with the embodiment of the invention shown in Figs. 1 through 5, though with the modified strip 14' as shown in Fig. 6, a larger angle of inclination of the board 10 may be utilized and at the same time prevent a block 20 from being placed at the top side of the strip. The slot 27' of the block 20, as shown in Fig. 6 has substantially upper and lower parallel surfaces and the base of the slot is rounded as indicated at 32.

The invention described above is particularly useful as an educational toy, though it is apparent that it is equally useful for other purposes, as in providing distinctive signs and posting information that must be modified periodically. From the foregoing, it is apparent that the depth of the block 20, the angle of inclination of the board 10 and the taper of the upper edge of the strips 14 and 14' and the lower edge of the strip 13 can be readily coordinated so that it is not possible to place a block in position on the board except under the conditions where the board is positioned right side up and the slot 27 or 27', as the case may be, is placed in engagement with the upper strip 14 or 14'.

While only certain embodiments of the invention have been illustrated and described, it is apparent that modifications, alterations and changes may be made without departing from the true scope and spirit of the appended claims.

What is claimed is:

1. An educational aid comprising a substantially flat board, at least one pair of strips on said board, one of said strips having a surface substantially perpendicular to the face of said board and a second surface inclined relatively to the first surface to form a relatively narrow edge part and a relatively wide base part for securing the strip to the board, the other strip of said pair being spaced from the first surface of said first strip and having at least inner portions of the upper and lower surfaces at right angles to the board and a block for engagement with and support by said strips, said block including a transverse slot having a width slightly greater than the width of said second strip and spaced from one edge of said block a distance slightly less than the distance between said strips whereby said block upon engagement with the other of said strips will be held firmly in place on the board and the second inclined surface of said one strip preventing said engagement of said blocks with the board when the latter is in an inverted position.

2. An educational aid comprising a substantially flat board, at least one pair of strips on said board, one of said strips having a surface substantially perpendicular to the face of said board and a second surface inclined relatively to the first surface to form a relatively narrow edge part and a relatively wide base part for securing the strip to the board, the other strip of said pair being spaced from the first surface of said first strip and having at least inner portions of the upper and lower surfaces at right angles to the board and a block for engagement with and support by said strips, said block including a transverse slot having a width slightly greater than the width of said second strip and spaced from one edge of said block a distance slightly less than the distance between said strips whereby said block upon engagement with the other of said strips will be held firmly in place on the board and the second inclined surface of said one strip preventing said engagement of said blocks with the board when the latter is in an inverted position and wherein the distance between said slot and said adjoining face is small in comparison to the height of the block.

3. An educational aid comprising a substantially flat board, at least one pair of strips on said board, one of said strips having a surface substantially perpendicular to the face of said board and a second surface inclined relatively to the first surface to form a relatively narrow edge part and a relatively wide base part for securing the strip to the board, the other strip of said pair being spaced from the first surface of said first strip and having at least inner portions of the upper and lower surfaces at right angles to the board and a block for engagement with and support by said strips, said block including a transverse slot having a width slightly greater than the width of said second strip and spaced from one edge of said block a distance slightly less than the distance between said strips whereby said block upon engagement with the other of said strips will be held firmly in place on the board and wherein said slot is in the rear face of said block, said bottom face is substantially perpendicular to the rear face and the side and top edges are inclined outwardly from the rear face.

References Cited in the file of this patent

UNITED STATES PATENTS

| | | |
|---|---|---|
| 156,959 | Taylor | Nov. 17, 1874 |
| 268,468 | Eastman | Dec. 5, 1882 |
| 1,315,077 | Barclay | Sept. 2, 1919 |
| 2,224,069 | Wagner | Dec. 3, 1940 |
| 2,415,342 | Donner | Feb. 4, 1947 |

FOREIGN PATENTS

| | | |
|---|---|---|
| 593,366 | Great Britain | Oct. 15, 1947 |